United States Patent
Yan et al.

(10) Patent No.: US 11,450,074 B1
(45) Date of Patent: Sep. 20, 2022

(54) METHOD AND SYSTEM FOR SHOWING OBJECTS IN AUGMENTED REALITY ENVIRONMENT

(71) Applicant: AMBIT MICROSYSTEMS (SHANGHAI) LTD., Shanghai (CN)

(72) Inventors: Yu-Hu Yan, New Taipei (TW); Chien-Sheng Wu, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 17/371,515

(22) Filed: Jul. 9, 2021

(30) Foreign Application Priority Data

Jun. 29, 2021 (CN) .......................... 202110726126.7

(51) Int. Cl.
| | |
|---|---|
| *G06T 19/00* | (2011.01) |
| *H04L 67/10* | (2022.01) |
| *G06F 3/16* | (2006.01) |
| *G06F 3/01* | (2006.01) |
| *G06F 21/60* | (2013.01) |

(52) U.S. Cl.
CPC .......... *G06T 19/006* (2013.01); *G06F 3/012* (2013.01); *G06F 3/165* (2013.01); *H04L 67/10* (2013.01); *G06F 21/602* (2013.01)

(58) Field of Classification Search
CPC ........ G06T 19/006; G06F 3/012; G06F 3/165
USPC .......................................................... 345/633
See application file for complete search history.

(56) References Cited

U.S. PATENT DOCUMENTS

| | | | |
|---|---|---|---|
| 2015/0084951 A1 | 3/2015 | Boivin et al. | |
| 2019/0327124 A1* | 10/2019 | Lai ........................... | H04B 1/38 |
| 2021/0112193 A1* | 4/2021 | Ter Haar ............ | H04N 5/23218 |
| 2021/0295602 A1* | 9/2021 | Scapel ....................... | G06T 7/70 |

FOREIGN PATENT DOCUMENTS

| | | |
|---|---|---|
| CN | 111897435 A | 11/2020 |
| TW | M506428 U | 8/2015 |

* cited by examiner

*Primary Examiner* — Thomas J Lett
(74) *Attorney, Agent, or Firm* — ScienBiziP, P.C.

(57) ABSTRACT

A method for showing objects in an augmented reality environment includes the steps of an Augmented Reality (AR) device obtaining spatial information and object identification (ID) from an anchor device. The AR device obtains parameters of the objects from a cloud system. The parameters of an object include the image of the object, the audio of the object, and a first spatial relationship between the object and an anchor device. The AR device obtains a second spatial relationship between the AR device and the anchor device. A third spatial relationship between the object and the AR device can be obtained according to the first spatial relationship and the second spatial relationship. The image of the object and the audio of the object is displayed or projected in the AR device according to the third spatial relationship.

8 Claims, 7 Drawing Sheets

METHOD AND SYSTEM FOR SHOWING OBJECTS IN AUGMENTED REALITY ENVIRONMENT

FIELD

The disclosure relates to augmented reality technology, in particular to a method and a system for showing objects in augmented reality environment.

BACKGROUND

Physical anchors must be scanned for their characteristics in creating a background against which objects can be downloaded, and a camera must be moved to do this. This consumes a lot of power and electricity for computing, and calculations for image information must be continued to confirm the physical anchors and the space in which the downloaded objects are set.

BRIEF DESCRIPTION OF THE DRAWINGS

Implementations of the present technology will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" embodiment in this disclosure are not necessarily to the same embodiment, and such references mean "at least one."

Figure 1:
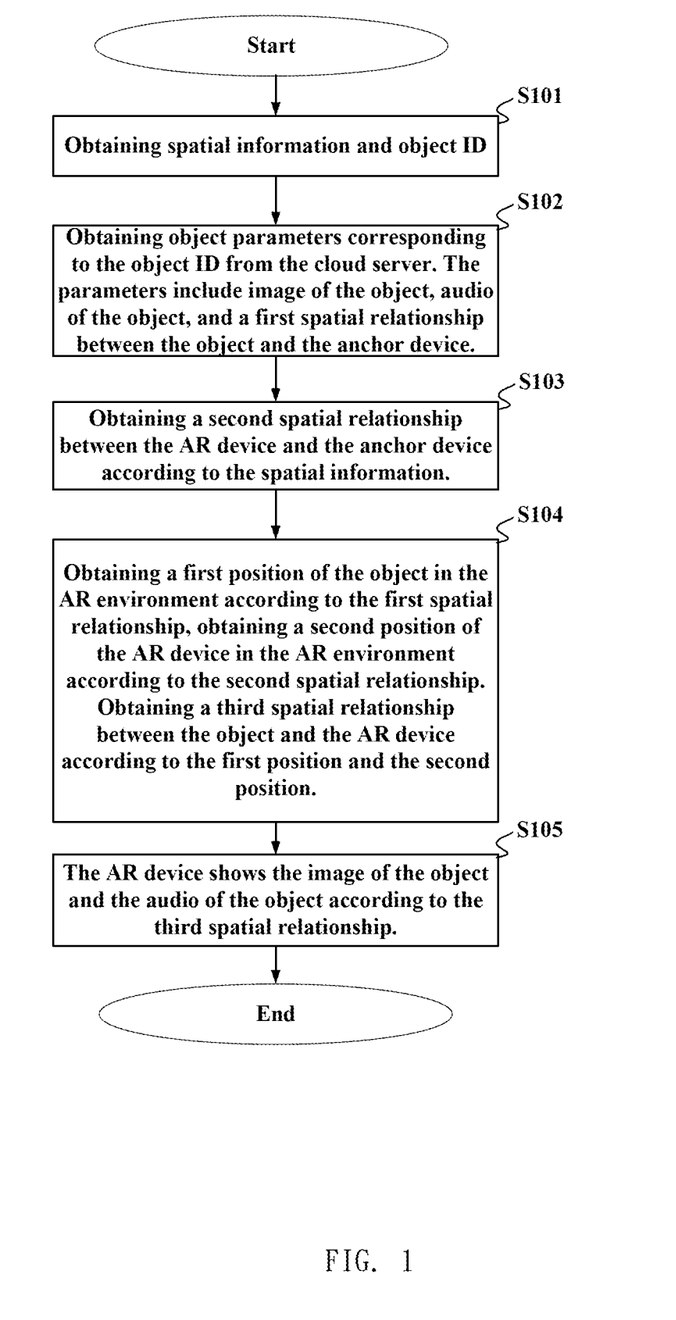
FIG. 1 is a flowchart of method to show objects in an augmented reality environment according to an embodiment of the disclosure.

FIG. 1 is a flowchart of method for showing objects in an augmented reality environment according to an embodiment of the disclosure.

As shown in FIG. 1, in step S101, in an augmented reality (AR) environment, an anchor device continuously broadcasts spatial information and object identification (ID). User can obtain spatial information and object ID from the anchor device when user wears the AR device and enters the AR environment.

In step S102, the AR device obtains the object ID from the anchor device. The AR device obtains from a cloud server parameters corresponding to the object ID. The parameters include image of the object, audio of the object and a first spatial relationship between the object and the anchor device. The image includes shape of the object, color of the object, size of the object. An orientation, a distance, and a horizontal angle between the object and the anchor device is given as a first spatial relationship.

In step S103, the AR device obtains a second spatial relationship, between the AR device and the anchor device. The second spatial relationship includes an orientation, a distance, and a horizontal angle between the AR device and the anchor device. The anchor device transmits a first spatial information packet through a first communication technology and a second spatial information packet through a second communication technology. The first spatial information packet and the second spatial information packet are transmitted at the same time. Speed of transmission of the first communication technology and the second communication technology are known. The AR device obtains the distance between the AR device and the anchor device according to the difference in transmission speeds between the first communication technology and the second communication technology, that is, the time difference between the AR device receiving the first spatial information packet and receiving the second spatial information packet. This feature is disclosed in U.S. patent application Ser. No. 17/338,940, titled "METHOD AND SYSTEM FOR ESTABLISHING ANCHORS IN AUGMENTED REALITY ENVIROMENT".

In step S104, the anchor device is taken as an origin or root in the AR environment, a first position of the object in the AR environment can be obtained according to the first spatial relationship and a second position of the AR device in the AR environment can be obtained according to the second spatial relationship. A third spatial relationship between the object and the AR device can be obtained according to the first position and the second position. The third spatial relation includes an orientation, a distance, and the horizontal angle between the object and the AR device.

In step S105, the AR device displays or projects the image of the object and the audio of the object according to the third spatial relationship. The size of the object in the image, the volume of the audio of the object, and the orientation of the object can be adjusted according to the third spatial relationship. A sense of reality in the AR environment is thus enhanced.

Figure 2:
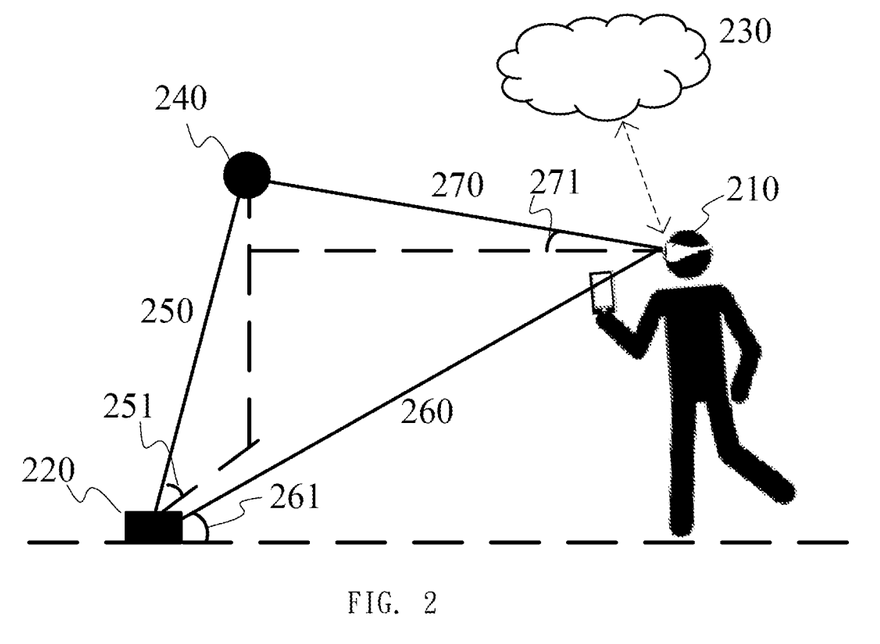
FIG. 2 is a system architecture diagram according to an embodiment of the disclosure.

FIG. 2 is a system architecture diagram according to an embodiment of the disclosure. As shown in FIG. 2, a system for showing objects in AR environment includes an AR device 210, an anchor device 220, a cloud server 230, and an object 240. The AR device 210 obtains spatial information and identification (ID) of the object 240 from the anchor device 220. The AR device 210 obtains parameters of the object 240 from the cloud server 230 according to the ID of object 240. The cloud server 230 stores and provides the parameters of the object 240. The parameters of the object 240 include an image of the object 240, audio of the object 240, and a first spatial relationship between the object 240 and the anchor device 220. The first spatial relationship includes orientation, a distance 250, and horizontal angle 251.

The second spatial relationship between the AR device 210 and the anchor device 220 is obtained according to the spatial information from the anchor device 220. The second spatial relationship includes orientation, a distance 260, and horizontal angle 261 between the AR device 210 and the anchor device 220. The anchor device 220 transmits first spatial information packet through a first communication technology and transmits second spatial information packet through a second communication technology. The first spatial information packet and the second spatial information packet are transmitted at the same time. A first transmission speed of the first communication technology and a second transmission speed of the second communication technology are known. The distance 260 between the AR device 210 and the anchor device 230 is obtained by reference to the first transmission speed and the second transmission speed and the time difference between receiving the first spatial information packet and receiving the second spatial information packet can be known.

The AR device 210 obtains the ID of the object from the anchor device 220. The AR device 210 obtains the parameters of the object 240 from the cloud server 230. The anchor device 220 can be regarded as the origin or root in the AR environment. A first position of the object 240 in the AR environment is obtained according to the first spatial relationship. A second position of the AR device 210 in the AR environment is obtained according to the first spatial relationship. A third spatial relationship between the object 240 and the AR device 210 is obtained according to the first position and the second position. The third spatial relationship includes an orientation, a distance 270, and a horizontal angle 271. The AR device 210 displays the image of the object and the audio of the object according to the third spatial relationship.

The AR device 210 further includes an inertial measurement unit (IMU). The IMU senses moving direction, moving distance, and moving height of the AR device 210. The second spatial relationship and the second position can be updated according to the IMU. The third spatial relationship can be updated according to the first position and the updated second position. The AR device 210 displays the image of the object and plays back audio of the object according to the updated third spatial relationship.

Figure 3:
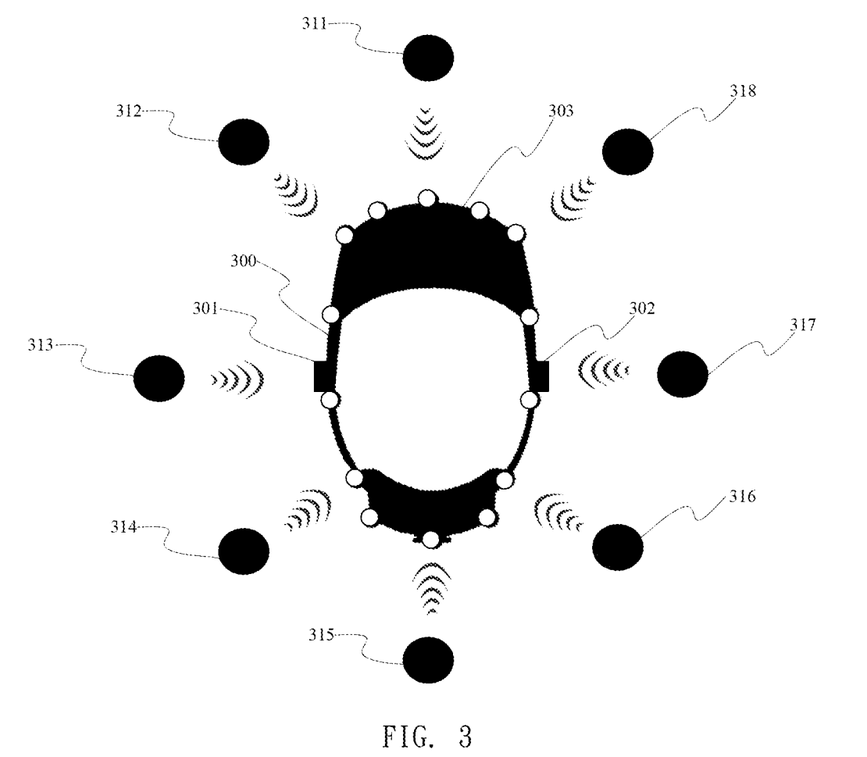
FIG. 3 is a diagram showing objects located at different positions in the augmented reality environment according to an embodiment of the disclosure.

FIG. 3 is a diagram showing objects located at different positions in the augmented reality environment according to an embodiment of the disclosure. In the embodiment, the AR device 300 includes a first speaker 301, a second speaker 302, and a display unit 303. The first speaker 301 targets the user's left ear and the second speaker 302 targets the user's right ear when the user is wearing the AR device 300. The audio volume and audio orientation of the object can be changed by adjusting the output of the first speaker 301 and the second speaker 302, as the display unit 303 changes its display or projection of an object according to the third spatial relationship when such object is shown by the AR device 300.

As shown in FIG. 3, the AR device 300 obtains an orientation, a distance, and horizontal angle between the object and the AR device 300 according to the third spatial relationship. For example, the object at location 311 is in front of the AR device 300. The display unit 303 shows an image of the object at the location 311. The size of the object or its image and the volume of the audio of the object are adjusted according to the distance and the horizontal angle of the third spatial relationship. The first speaker 301 and the second speaker emit audio of the object. Audio of the object emitted by the first speaker 301 and the second speaker 302 can be at the same time and with the same volume.

For another example, the object is at location 312. The display unit 303 shows the image of the object at location 312. The size of the object and the audio of the object are adjusted according to the distance and the horizontal angle of the third spatial relationship. The first speaker 301 can emit audio of the object before the second speaker 302 and the volume of the object from the first speaker 301 is greater than that of the second speaker 302.

For another example, the object at location 313. The object is not shown by the display unit 303. The audio of the object are adjusted according to the distance and the horizontal angle of the third spatial relationship. The first speaker 301 emits audio of the object before the second speaker 302. The volume of the object of the second speaker 302 can be zero or less than that of the first speaker 302.

By analogy, the image of the object and the audio of the object are adjusted according to the third spatial relationship when the object is displayed at locations 311-318, as shown in Table 1.

TABLE 1

| location | image of the object/audio of the object |
| --- | --- |
| location 311 | image: the size is adjusted according to the distance and the horizontal angle.<br>audio: the order of emitting and the volume of the first speaker and the second speaker are set according to the distance and the angle. Specifically, the order of the first speaker and the second speaker emitting audio are the same. The volume of the first speaker and the second speaker are the same. |
| location 312 | image: the size is adjusted according to the distance and the horizontal angle.<br>audio: the order of emitting and the volume of the first speaker and the second speaker are set according to the distance and the angle. Specifically, the first speaker emits audio of the object before the second speaker. The volume of the first speaker is greater than the second speaker. |
| location 313 | image: no display<br>audio: the order of emitting and the volume of the first speaker and the second speaker are set according to the distance and the angle.<br>Specifically, the first speaker emits audio of the object before the second speaker. The volume of the second speaker is zero or less than the first speaker. |
| location 314 | image: no display<br>audio: the order of emitting and the volume of the first speaker and the second speaker are set according to the distance and the angle.<br>Specifically, the first speaker emits audio of the object before the second speaker. The volume of the first speaker is greater than the second speaker. |
| location | image: no display |

TABLE 1-continued

| location | image of the object/audio of the object |
|---|---|
| 315 | audio: the order of emitting and the volume of the first speaker and the second speaker are set according to the distance and the angle. Specifically, between the the first speaker and the second speaker, audio is emitted at the same time. The volume of the first speaker and the second speaker are the same. |
| location 316 | image: no display audio: the order of emitting and the volume of the first speaker and the second speaker are set according to the distance and the angle. Specifically, the first speaker emits audio of the object later than the second speaker. The volume of the first speaker is less than the second speaker. |
| location 317 | image: no display audio: the order of emitting audio and the volume of the first speaker and the second speaker are set according to the distance and the angle. Specifically, the first speaker emits audio of the object later than the second speaker. The volume of the first speaker is zero or less than the second speaker. |
| location 318 | image: no display audio: the order of emitting and the volume of the first speaker and the second speaker are set according to the distance and the angle. Specifically, the first speaker emits audio of the object later than the second speaker. The volume of the first speaker is less than the second speaker. |

Figure 4:
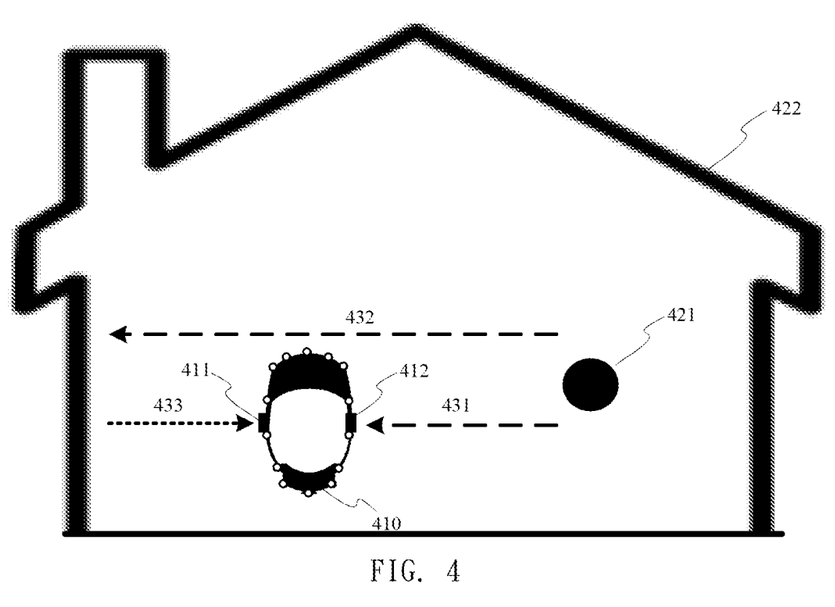
FIG. 4 is an application scenario diagram showing multiple objects according to an embodiment of the disclosure.

FIG. 4 is an application scenario diagram showing multiple objects according to an embodiment of the disclosure. As shown in FIG. 4, in the embodiment includes an AR device 410, a first object 421 and a second object 422. The AR device 410 includes a first speaker 411 and a second speaker 412. The first speaker 411 targets the user's left ear and the second speaker 412 targets the user's right ear when the user is wearing the AR device 410. The first object 421 includes audio of the object. The second object 422 is a large object in the shape of the house as shown in FIG. 4. The first object 421 is located on the right side of the AR device 410 and separated by a first distance 431. A second distance 432 is the distance between the first object 421 and a left wall of the second object 422, which can be obtained according to the position of the first object 421 relative to the AR device 410 and the position of the second object 422 relative to the AR device 410. A third distance 433 is the distance between the AR device 410 and the left wall of the second object 422.

Timing of the audio of the first object 421 emitted by the first speaker 411 can be adjusted according to the second distance 432 plus the third distance 433 and the sum being divided by the speed of sound. Volume of the first object 421 emitted by the second speaker 412 can be adjusted according to a system volume default value minus 20*log, the difference being multiplied by the first distance 431 over a reference distance. The system volume default value is an initial definition of the volume of the audio of the object. The reference distance is defined by the user. Volume of the first object 421 as emitted by the first speaker 411 can be adjusted according to volume of the second speaker 422 minus 20*log, the difference being multiplied by the second distance 432 plus the third distance 433 over the first distance 431.

Figure 5:
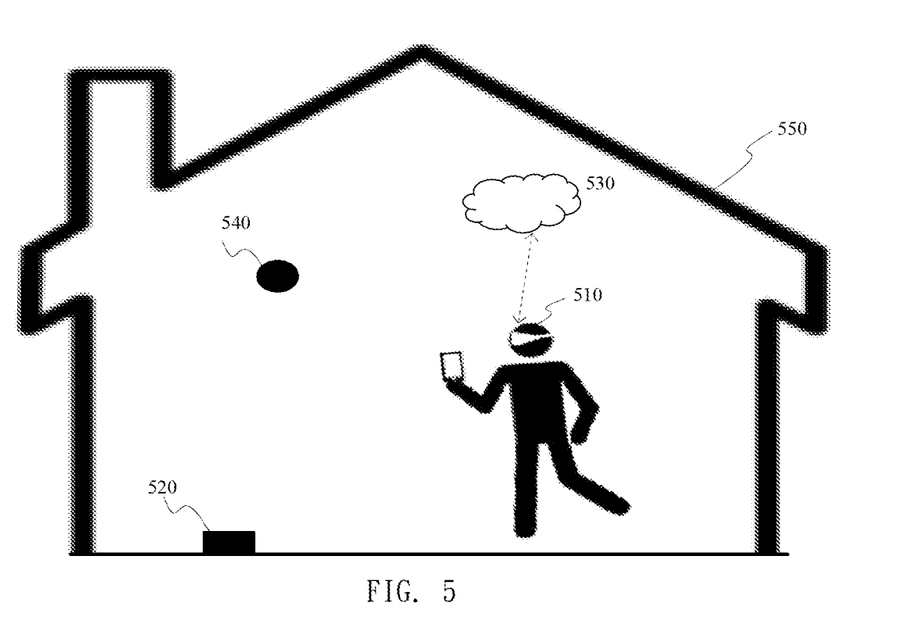
FIG. 5 is another application scenario diagram showing multiple objects according to an embodiment of the disclosure.

FIG. 5 is another application scenario diagram showing multiple objects according to an embodiment of the disclosure. As shown in FIG. 5, an AR device 510 obtains a second spatial relationship between the AR device 510 and an anchor device 520 and identification (ID) of the objects through the anchor device 520. The AR device 510 obtains parameters corresponding to the object ID from a cloud server 530. In the embodiment, the ID of objects includes a first ID of the first object and a second ID of the second object. As shown in FIG. 5, the size of object in an image or the image itself can be as small as the first object 540 displayed near the user. It can also be as big as the second object 550 to include the user. In the embodiment, the parameters of the object include a time-parameter. The periods of display of the first object 540 and the second object 550 are set through the AR device according to the time-parameter of the first object 540 and the second object 550. For example, the first object 540 can be constantly displayed and the second object 550 can be displayed in specific time period. Specifically, objects can be divided into resident objects and time-limited objects. The image of the second object 550 is a house and the time-parameter of such object is permanent. The second object 550 can be displayed in the AR device 510 after the AR device 510 obtains the second object 550 from the cloud server. In some application scenarios, the second object 510 can be advertising boards, road signs, buildings, etc. In another application scenario, the objects belong to time-limited objects, like speech, sport games, live broadcast, etc. The object can be displayed in real time or the display period of the object can be set to be displayed in a specific time period through the setting of time-parameter.

Figure 6:
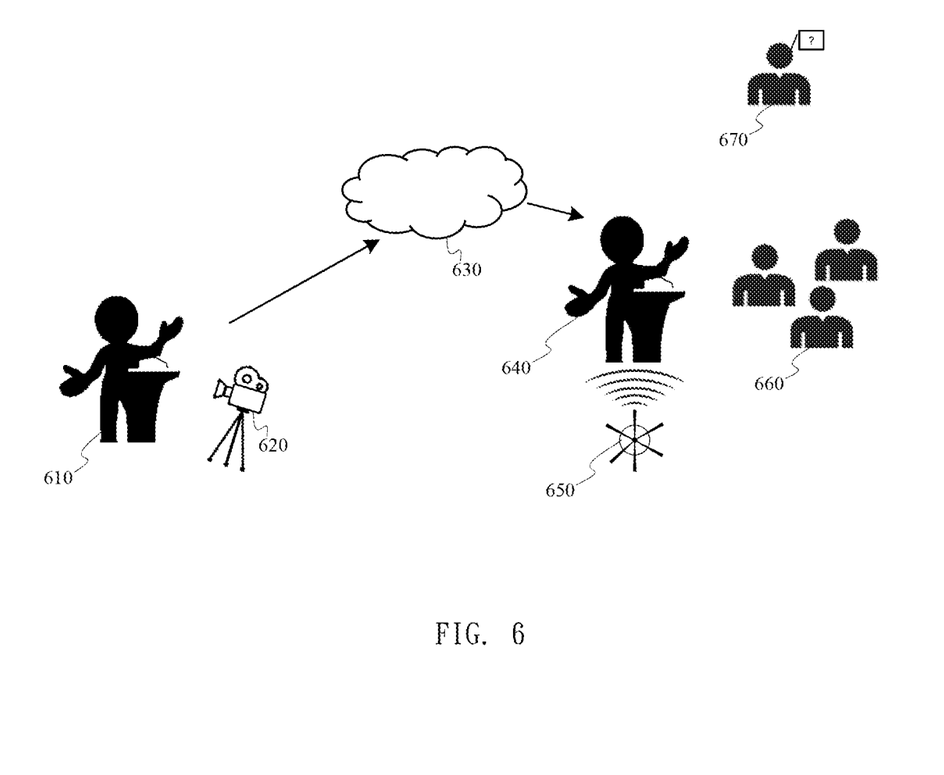
FIG. 6 is an application scenario diagram of objects shown remotely in real-time according to an embodiment of the disclosure.

FIG. 6 is an application scenario diagram of remote real-time showing objects according to an embodiment of the disclosure. As shown in FIG. 6, a performer 610 uses a camera 620 to capture image of an object 640 and sends the image to the cloud server 630. The object 640 of the performer 610 can be displayed in the remote scene. Users wear the AR device and locate the position of the object 640 in the remote scene through an anchor device 650. In the embodiment, the parameter of the object further includes an encryption-parameter. The encryption-parameter includes encrypted parameter and unencrypted parameter. The object 640 with unencrypted parameter is displayed in the AR device. The object 640 with encrypted parameter is displayed in the AR device which can decode the encryption parameter.

Figure 7:
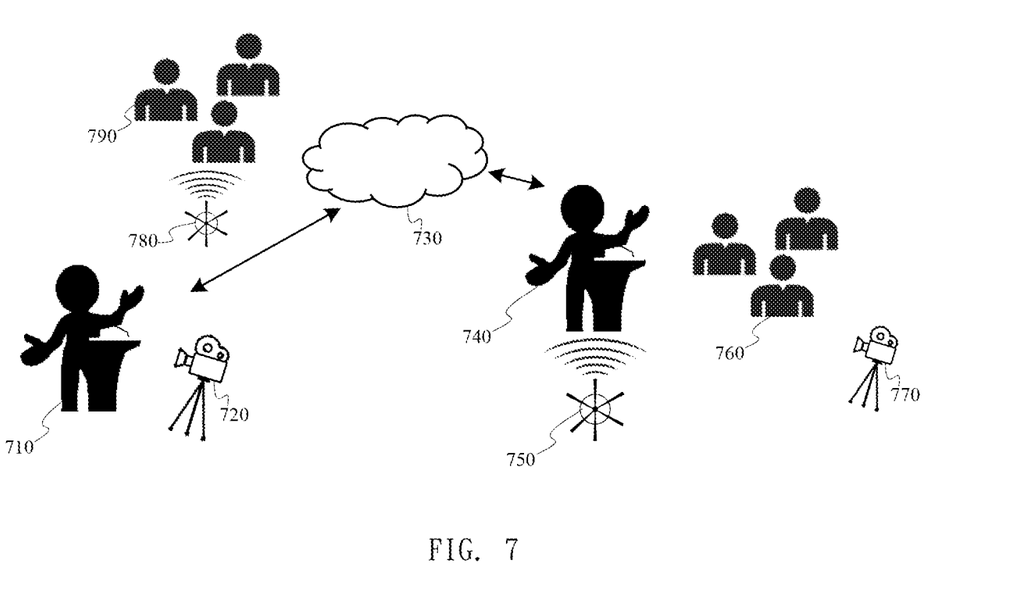
FIG. 7 is another application scenario diagram of objects shown remotely in real-time according to an embodiment of the disclosure.

FIG. 7 is another application scenario diagram of showing remote objects in real time according to an embodiment of the disclosure. As shown in FIG. 7, a performer 710 uses a camera 720 to capture image of object 740 and sends the image to the cloud server 730. The object 740 of the performer 710 can be displayed in the remote scene. A position of the object 740 is located by an anchor device 750. Users 760 display the object 740 at the position. At the same time, users 760 use a camera 770 to capture image of an object 790 and sends the object 790 to the cloud server 730. The object 790 of the users 760 can be shown in the scene with the performer 710. A position of the object 790 is located by an anchor device 780. Thus, the performer 710 and the users 760 can interact in real time from remote stations.

The embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for showing an object by an augmented reality (AR) device in AR environment, wherein the method comprising:
   obtaining spatial information and an identification (ID) of the object from an anchor device;
   obtaining parameters of the object from a cloud server according to the ID of the object, the parameters of the object includes an image of the object, audio of the object and a first spatial relationship between the object and the anchor device;
   obtaining a second spatial relationship between the AR device and the anchor device according to the spatial information;
   obtaining a first position of the object according to the first spatial relationship;
   obtaining a second position of the AR device according to the second spatial relationship;
   obtaining a third spatial relationship between the object and the AR device according to the first position and the second position;
   showing the image of the object and the audio of the object according to the third spatial relationship.

2. The method of claim 1, wherein the AR device further includes an inertial measurement unit (IMU) configured to obtain a moving direction, a moving distance, a moving height of the AR device;
   the second spatial relationship and the third spatial relationship are updated according to the moving direction, the moving distance, the moving height of the AR device.

3. The method of claim 1, wherein the parameters of the object include a time parameter, which use to set time of displaying the object.

4. The method of claim 1, wherein the parameters of the object further comprise an encryption-parameter;
   the encryption-parameter includes encrypted parameter and unencrypted parameter;
   the object with unencrypted parameter is displayed in the AR device;
   the object with encrypted parameter is displayed in the AR device which can decoding the encryption parameter.

5. A system for showing objects by an augmented reality (AR) device in AR environment, comprising:
   an AR device obtains spatial information and an identification (ID) of the object from an anchor device;
   the AR device obtains parameters of the object from a cloud server according to the ID of the object, the parameters of the object includes an image of the object, audio of the object and a first spatial relationship between the object and the anchor device;
   the AR device obtains a second spatial relationship between the AR device and the anchor device according to the spatial information;
   the AR device obtains a first position of the object according to the first spatial relationship;
   the AR device obtains a second position according to the second spatial relationship;
   the AR device obtains a third spatial relationship between the object and the AR device according to the first position and the second position;
   the AR device shows the image of the object and the audio of the object according to the third spatial relationship.

6. The system of claim 5, wherein the AR device further includes an inertial measurement unit (IMU) configured to obtain a moving direction, a moving distance, a moving height of the AR device;
   the second spatial relationship and the third spatial relationship are updated according to the moving direction, the moving distance, the moving height of the AR device.

7. The system of claim 5 wherein the parameters of the object include a time parameter, which use to set time of displaying the object.

8. The system of claim 5, wherein the parameters of the object further comprise an encryption-parameter;
   the encryption-parameter includes encrypted parameter and unencrypted parameter;
   the object with unencrypted parameter is displayed in the AR device;
   the object with encrypted parameter is displayed in the AR device which can decoding the encryption parameter.

* * * * *